US012281189B2

(12) United States Patent
Jamieson et al.

(10) Patent No.: US 12,281,189 B2
(45) Date of Patent: Apr. 22, 2025

(54) PROCESS FOR PRODUCING A POLYMER COMPOSITION

(71) Applicant: BOREALIS AG, Vienna (AT)

(72) Inventors: John Jamieson, Porvoo (FI); Jari-Jussi Ruskeeniemi, Kulloo (FI); Floran Prades, Linz (AT); Noureddine Ajellal, Kulloo (FI); Tua Sundholm, Kulloo (FI); Jouni Purmonen, Kulloo (FI); Angelica Maëlle Delphine Legras, Linz (AT); Katja Klimke, Linz (AT); Andreas Albrecht, Linz (AT)

(73) Assignee: BOREALIS AG, Vienna (AT)

( * ) Notice: Subject to any disclaimer, the term of this patent is extended or adjusted under 35 U.S.C. 154(b) by 768 days.

(21) Appl. No.: 17/424,992

(22) PCT Filed: Jan. 27, 2020

(86) PCT No.: PCT/EP2020/051904
§ 371 (c)(1),
(2) Date: Jul. 22, 2021

(87) PCT Pub. No.: WO2020/156993
PCT Pub. Date: Aug. 6, 2020

(65) Prior Publication Data
US 2022/0089802 A1 Mar. 24, 2022

(30) Foreign Application Priority Data
Jan. 28, 2019 (EP) ...................... 19153944

(51) Int. Cl.
| | |
|---|---|
| *C08F 255/02* | (2006.01) |
| *B29C 48/40* | (2019.01) |
| *B29K 96/02* | (2006.01) |
| *C08K 5/09* | (2006.01) |
| *C08K 5/14* | (2006.01) |
| *C08L 23/06* | (2006.01) |
| *C08L 23/08* | (2006.01) |
| *C09J 123/06* | (2006.01) |
| *C09J 123/16* | (2006.01) |
| *C08L 23/0807* | (2025.01) |

(52) U.S. Cl.
CPC ............ *C08F 255/02* (2013.01); *B29C 48/40* (2019.02); *C08K 5/09* (2013.01); *C08K 5/14* (2013.01); *C09J 123/06* (2013.01); *C09J 123/16* (2013.01); *B29K 2096/02* (2013.01); *C08L 23/06* (2013.01); *C08L 23/0815* (2013.01)

(58) Field of Classification Search
CPC ........ C08L 23/06; C08L 51/00; C08L 51/003; C08L 51/06; C08F 255/00; C08F 255/02; C08F 255/026; C09J 123/06; C09J 123/16; C09J 151/00; B29C 48/40; B29K 2096/02
See application file for complete search history.

(56) References Cited

U.S. PATENT DOCUMENTS

| | | | |
|---|---|---|---|
| 5,001,205 A | 3/1991 | Hoel | |
| 5,001,244 A | 3/1991 | Welborn, Jr. | |
| 8,378,025 B2 | 2/2013 | Botros et al. | |
| 9,650,548 B2 | 5/2017 | Lee et al. | |
| 9,803,074 B2 | 10/2017 | Botros et al. | |
| 2008/0032148 A1 | 2/2008 | Lee et al. | |
| 2013/0052471 A1 | 2/2013 | Botros et al. | |
| 2013/0260064 A1 | 10/2013 | Botros et al. | |
| 2015/0111034 A1 | 4/2015 | Botros | |
| 2015/0210902 A1 | 7/2015 | Botros | |
| 2016/0304650 A1 | 10/2016 | Read | |
| 2017/0253732 A1 | 9/2017 | Vielsack | |
| 2018/0010022 A1 | 1/2018 | Botros | |
| 2018/0044511 A1 | 2/2018 | Botros et al. | |
| 2023/0250320 A1* | 8/2023 | Klimke | B32B 7/12 428/523 |

FOREIGN PATENT DOCUMENTS

| | | |
|---|---|---|
| CN | 105778836 A | 7/2016 |
| EP | 0678103 A1 | 10/1995 |
| EP | 0688794 A1 | 12/1995 |
| EP | 0721474 A1 | 7/1996 |
| EP | 0769027 A1 | 4/1997 |
| EP | 810235 A2 | 12/1997 |
| EP | 0949274 A2 | 10/1999 |
| EP | 1315598 A2 | 6/2003 |
| EP | 1316598 A1 | 6/2003 |
| EP | 1859926 A1 | 11/2007 |
| EP | 2570195 A1 | 3/2013 |
| EP | 3053976 A1 | 8/2016 |
| JP | 2017501280 A | 1/2017 |
| WO | 1987003604 A1 | 6/1987 |
| WO | 9112182 A1 | 8/1991 |

(Continued)

OTHER PUBLICATIONS

CN105778836 machine translation (Year: 2024).*
International Search Report for Application No. PCT/EP2020/051904 mailed Mar. 26, 2020, 15 pages.
European Search Report for Application No. 19153944.4 mailed Oct. 10, 2019, 17 pages.
C. Jackson and H. G. Barth, "Molecular Weight Sensitive Detectors" in: Handbook of Size Exclusion Chromatography and related techniques, C.-S. Wu, 2nd ed., Marcel Dekker, New York, 2004, p. 103.

(Continued)

Primary Examiner — Marc S Zimmer
Assistant Examiner — Jeffrey S Lenihan
(74) Attorney, Agent, or Firm — Lowenstein Sandler LLP

(57) ABSTRACT

Process for producing a polymer composition, a polymer composition obtainable by said process and the use of said polymer composition as adhesive polymer composition and for the production of a multilayer structure, such as a three-layer metal pipe coating, with improved peel strength.

14 Claims, 1 Drawing Sheet

(56) References Cited

FOREIGN PATENT DOCUMENTS

| | | | |
|---|---|---|---|
| WO | 9212182 | A1 | 7/1992 |
| WO | 1993025590 | A1 | 12/1993 |
| WO | 9509191 | A1 | 4/1995 |
| WO | 9512622 | A1 | 5/1995 |
| WO | 9618662 | A1 | 6/1996 |
| WO | 9728170 | A1 | 8/1997 |
| WO | 9856831 | A1 | 12/1998 |
| WO | 9858001 | A1 | 12/1998 |
| WO | 9951646 | A1 | 10/1999 |
| WO | 9965949 | A2 | 12/1999 |
| WO | 0034341 | A2 | 6/2000 |
| WO | 0040620 | A1 | 7/2000 |
| WO | 0155230 | A1 | 8/2001 |
| WO | 0155275 | A1 | 8/2001 |
| WO | 2005118655 | A1 | 12/2005 |
| WO | 2008089978 | A1 | 7/2008 |
| WO | 2015158790 | A2 | 10/2015 |
| WO | 2015158791 | A2 | 10/2015 |
| WO | 2017108951 | A1 | 6/2017 |
| WO | 2017108969 | A1 | 6/2017 |
| WO | 2018108917 | A1 | 6/2018 |
| WO | 2018108918 | A1 | 6/2018 |
| WO | 2018178151 | A1 | 10/2018 |
| WO | 2018178152 | A1 | 10/2018 |
| WO | 0218100 | A2 | 3/2022 |

OTHER PUBLICATIONS

Third Party Observation for European Patent application No. EP2020051904 dated Jan. 6, 2021, 11 pages.
Notification of Third Party Observation for PCT/EP2020/051904 mailed Jan. 8, 2021, 12 pages.
Stamylex 2H 568, "Octene-1 linear low density polyethylene" Data Sheet, May 2013, 2 pages.
Stamylex 1026 F, "Octene-1 linear low density polyethylene" Data Sheet, May 2013, 2 pages.
Stamylex 1046 F, "Octene-1 linear low density polyethylene" Data Sheet, May 2013, 2 pages.
Stamylex 1066 F, "Octene-1 linear low density polyethylene" Data Sheet, May 2013, 2 pages.
Stamylex 4046 F, "Octene-1 linear low density polyethylene" Data Sheet, May 2013, 2 pages.
MSM Kunststoflen B.V., Stamylex Brochure, "List of Linear Polythylene Grades for Rotation Moulding" Data Sheet, Mar. 1994, 15 pages.
Office Action for Saudi Arabia Patent Application No. 521422618 dated Jul. 5, 2024, 19 pages.
Office Action for United Arab Emirates Application No. P6002305/2022 mailed Dec. 16, 2024, 7 pages.
Office Action with English Translation for Saudi Arabian Patent Application No. 521422618 dated Feb. 14, 2025, 12 pages.

* cited by examiner

PROCESS FOR PRODUCING A POLYMER COMPOSITION

CROSS REFERENCE TO RELATED APPLICATION(S)

The present application is a national stage entry under 35 U.S.C. § 371 of International Application No. PCT/EP2020/051904 filed on Jan. 27, 2020, which claims priority to EP Application Serial No. 19153944.4 filed on Jan. 28, 2019, the contents of which are incorporated in their entirety.

The present invention relates to a process for producing a polymer composition, a polymer composition obtainable by said process and the use of said polymer composition as adhesive polymer composition and for the production of a multi-layer structure, such as an adhesive layer of a three-layer metal pipe coating, with improved peel strength.

BACKGROUND OF THE INVENTION

Multi-layered structures comprising two, three, four or more layers are known for many applications. In these multi-layer structures different layers most often consist of different materials which accordingly have different physical and chemical properties. This results in the problem that adjacent layers do not or only to an insufficient extent adhere to each other. Therefore, it is commonly known to build up multi-layer structures with intermediate adhesive layers for improving adhesion of adjacent layers consisting of different materials and thus avoid delamination.

One prominent example of multi-layered structures are coatings for metal pipes.

Commonly a three-layer coating is provided on the outer surface of metal pipes in order to protect the pipe against mechanical damages and corrosion. A three-layer coating usually consists of an epoxy layer which is designed to firmly adhere to the outer surface of the metal wall of the pipe, an intermediate adhesive layer and an outer polyolefin protective layer which commonly is a high density polyethylene, a cross-linked polyethylene or a polypropylene. The three-layer structure shows improved properties compared to formerly known single-layer coatings. On the one hand, the epoxy layer shows an improved bonding to the metal wall, avoids cathodic disbondment and provides less oxygen penetration whereas on the other hand the outer polyolefin protective layer provides good mechanical protection, and less water penetration. However, in order to avoid delamination of the polyolefin protective layer and the epoxy layer which would result in damage of the multi-layer coating an adhesive layer between both layers is necessary.

Adhesive compositions and processes for producing such adhesive compositions are known from EP 1 316 598 A1. This adhesive composition comprise a blend of a non-elastomeric polyethylene, polymerized in the presence of a single site catalyst, and an elastomer, wherein either the non-elastomeric polyethylene or the blend has been grafted with an acid grafting agent. A coating comprising an adhesive layer comprising said adhesive composition showed good adhesion properties in form of good peel strength.

For three layer pipe coating ISO 21809-1:2011 defines the minimum requirements regarding peel strength of at least 100 N/cm at 23° C. for Class A coatings, at least 150 N/cm at 23° C. for Class B coatings and at least 250 N/cm at 23° C. for Class C coatings and of at least 20 N/cm at 60° C. for Class A coatings, at least 30 N/cm at 80° C. for Class B coatings and at least 40 N/cm at 90° C. for Class C coatings. Conversion technology in the metal pipe coating market, especially the steel pipe coating market, is changing towards faster line speeds and thicker steel pipes which leads to shorter water cooling times and tend to limit the amount of cooling capacity available to the coating. Currently used adhesive compositions, such as e.g. disclosed in EP 1 316 598 A1 are showing sensitivity to these conditions and frequently do not meet the peel strength requirements.

Thus, there is a need for adhesive compositions suitable for multi-layered structures, such as three-layer metal pipe coatings, which improve the peel strength of coatings which are subjected to shorter water cooling times.

It has surprisingly been found that adhesive compositions comprising a blend of a non-elastomeric polyethylene and an elastomer which have been grafted with an acid grafting agent in a compounding step in which the temperature profile of the extruder is carefully controlled, show improved adhesion properties, like sufficiently high peel strength also when used in coatings that are subjected to shorter water cooling times.

SUMMARY OF THE INVENTION

The present invention relates to a process for producing a polymer composition comprising
(A) a non-elastomeric polyethylene,
(B) an elastomer, and
(C) an acid grafting agent,
comprising the steps of:
  feeding components (A), (B) and (C) into an extruder comprising a feeding section, a barrel section and a die plate, wherein the barrel section of the extruder downstream of the feeding section and upstream of the die plate is divided into a plurality of control zones, and the first control zone represents the first control zone within the barrel section downstream of the feeding zone in which the fed component(s) (A) and/or (B) start(s) to melt;
  compounding the components (A) and (B) in order to form the polymer composition; and
  grafting component (A) or components (A) and (B) with component (C) during the compounding step;
characterized in that the process further comprises the step of
  independently controlling the temperature of each control zone of the plurality of control zones of the barrel section of the extruder as such that
    a) the temperature in the first control zone of the barrel section downstream of the feeding section is in the range of from higher than 85° C. to 180° C.;
    b) the temperature of the control zones of the barrel section from the first control zone of the barrel section downstream the feeding section to the control zone in the middle of the barrel section is increased over the length of the barrel section in two or more steps so that the temperature of the control zone in the middle of the barrel section is from 105% to 145% of the temperature in the first control zone of the barrel section downstream of the feeding section; and
    c) the temperature of the control zones of the barrel section from control zone in the middle of the barrel section to the control zone of the barrel section directly upstream of the die plate is maintained at the same temperature or increased to a temperature of not more than 120% of the temperature of the control zone in the middle of the barrel section.

Further, the invention is related to a polymer composition obtainable from the process as defined above or below.

Still further, the present invention is related to the use of the polymer composition as defined above or below for the production of a multi-layer structure.

Additionally, the present invention is related to the use of a polymer composition as defined above or below as an adhesive polymer composition.

Definitions

Extruders are conveying devices that, according to the working principle of the Archimedean screw, evenly press solid to viscous masses out of a shaping opening under high pressure and high temperature. An extruder basically consists of a screw shaft, also called a screw. It is situated in a so-called barrel. The nominal diameter of the bore of the barrel is equal to the outer diameter of the screw. At the downstream end of the barrel is the shaping outlet opening, usually called die plate. At the downstream end of the barrel is the drive, in most cases an electric motor with gear unit (extruder gear), which ensures the rotation of the screw. The screw itself is generally divided into three sections that perform different tasks. In the downstream area of the barrel is the so-called feeding section. In the feeding section the material to be extruded is fed into the extruder through a hopper ("feeding"). This is followed by the compression section, in which the material is conveyed, melted and compacted. Further downstream within the compression section the material is further compressed by the reduced flight depth of the screw and thus the pressure required for the discharge in the tool is built up. Finally, the discharge section ensures a homogeneous flow of material to the die plate. In the present invention the term "barrel section" encompasses the parts of the barrel which surround the compression section and the discharge section of the screw upstream of the feeding section and downstream of the die plate. The barrel section is heated. The heating of barrel section can independently be controlled in so-called "control zones". In the present invention the so-called "first control zone" represents the first control zone within the barrel section downstream of the feeding zone in which the material, usually components (A) and/or (B) and optionally component (C), starts to melt. The temperature of the first control zone is therefore set to a temperature of above 85° C. to 180° C.

A polyethylene is a polymer, wherein the molar amounts of the monomer units add up to a total amount of at least 50 mol-% ethylene monomer units.

An 'ethylene homopolymer' denotes a polymer consisting essentially of ethylene monomer units. Due to the requirements of large-scale polymerization it may be possible that the ethylene homopolymer includes minor amounts of comonomer units, which usually is below 0.1 mol %, preferably below 0.05 mol %, most preferably below 0.01 mol % of the ethylene homopolymer.

A polymer is denoted 'ethylene copolymer' if the polymer is derived from ethylene monomer units and at least one alpha-olefin comonomer. The alpha-olefin conomoner preferably is selected from alpha-olefin comononers with from 4 to 12 carbon atoms, more preferably from 4 to 10 carbon atoms and most preferably from 4 to 8 carbon atoms. Suitable alpha-olefin comonomer species are 1-butene, 1-hexene, 4-methyl-1-pentene, 1-octene or their mixtures. Preferred are 1-hexene and 1-octene.

A polymer comprising more than one fraction differing from each other in at least one property, such as weight average molecular weight or comonomer content, is called "multimodal". If the multimodal polymer includes two different fractions, it is called "bimodal" and, correspondingly, if it includes three different fractions, it is called "trimodal". The form of the molecular weight distribution curve, i.e. the appearance of the graph of the polymer weight fraction as function of its molecular weight, of such a multimodal polymer will show two or more maxima depending on the modality or at least be distinctly broadened in comparison with the curves of the individual fractions.

In contrast to a multimodal polymer a unimodal polymer only exhibits a single maximum in the molecular weight distribution curve. A unimodal polymer only includes one polymer fraction which cannot be distinguished by weight average molecular weight or comonomer content.

An elastomer is a polymer with viscoelasticity (i.e., both viscosity and elasticity) and very weak intermolecular forces, and generally low Young's modulus and high failure strain compared with other materials. Elastomers are amorphous polymers maintained above their glass transition temperature.

An acid grafting agent is a component comprising an acid based functional group which is grafted onto the backbone of a polymer. Suitable grafting methods include chemical treatment, photo-irradiation or high-energy radiation through which a radical is formed on the polymer backbone. The acid grafting agent then reacts with the radical and forms a bond with the polymeric backbone. Mostly preferred is chemical treatment initiated by an organic peroxide.

In the following amounts are given in % by weight (wt %) if not stated otherwise.

FIGURES

DETAILED DESCRIPTION OF THE INVENTION

Process

Figure 1:
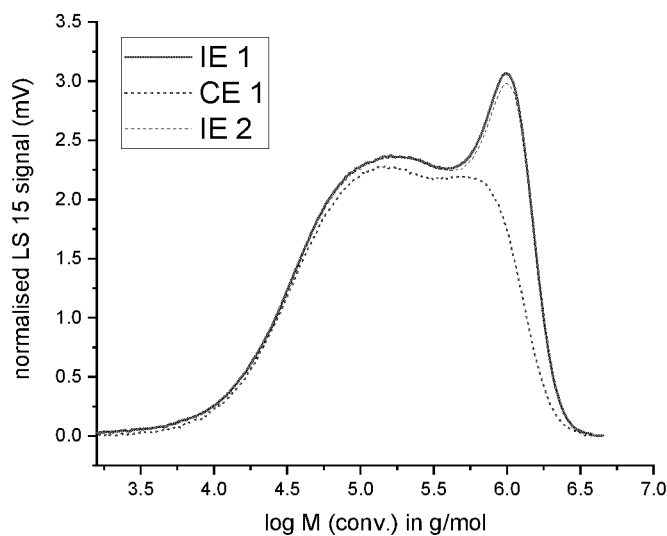
FIG. 1 shows a comparison of the GPC curve in a graph of the normalized LS 15 concentration over the log M of examples CE1, IE1 and IE2.

The present invention relates to a process for producing a polymer composition comprising (A) a non-elastomeric polyethylene, (B) an elastomer, and (C) an acid grafting agent, comprising the steps of:

feeding components (A), (B) and (C) into an extruder comprising a feeding section, a barrel section and a die plate, wherein the barrel section of the extruder downstream of the feeding section and upstream of the die plate is divided into a plurality of control zones, and the first control zone represents the first control zone within the barrel section downstream of the feeding zone in which the fed component(s) (A) and/or (B) start(s) to melt;

compounding the components (A) and (B) in order to form the polymer composition; and grafting component (A) or components (A) and (B) with component (C) during the compounding step;

characterized in that the process further comprises the step of independently controlling the temperature of each control zone of the plurality of control zones of the barrel section of the extruder as such that a) the temperature in the first control zone of the barrel section downstream of the feeding section is in the range of from higher than 85° C. to 180° C., b) the temperature of the control zones of the barrel section from the first control zone of the barrel section downstream the feeding section to the control zone in the middle of the barrel section is increased over the length of the barrel section in two or more steps so that the temperature of the control zone in the middle of the barrel section is from 105% to 145% of the temperature in the first control zone of the barrel section downstream of the feeding section; and c) the temperature of the control zones of the barrel section from control zone in the middle of the barrel section to the control zone of the barrel section directly upstream of the die plate in maintained at the same temperature or increased to a temperature of not more than 120% of the temperature of the control zone in the middle of the barrel section.

In one embodiment, components (A), (B) and (C) are preferably fed together into the feeding section of the extruder.

Preferably, components (A), (B) and (C) are blended to form a blend of components (A), (B) and (C). Said blend is the feed into the feeding section of the extruder.

It is preferred that the components (A), (B) and (C), preferably the blend of components (A), (B) and (C), are fed into the feeding section of the extruder through the hopper.

In another embodiment, components (A) and (B) are preferably fed into the feeding section of the extruder. Component (C) then can also be fed into the feeding section but also into the barrel section, preferably into a control zone of the barrel section set to a temperature of 180° C. or lower.

It is preferred that components (A) and (B) are fed into the feeding section of the extruder and component (C) is fed into the barrel section, preferably a control zone of the barrel section set to a temperature of 180° C. or lower.

Optionally further additives as described below can be fed into the extruder.

Preferably, the further additives are fed into the barrel section of the extruder. These further additives or other polymer components can be fed together with the component (C) into a control zone of the barrel section set to a temperature 180° C. or lower. It is, however, preferred that these further additives or other polymer components are fed into one of the downstream control zones of the barrel section of the extruder, preferably into a control zone of the barrel section set to a temperature of more than 180° C.

The temperature in the feeding section is preferably below 100° C., such as from 20° C. to 70° C., more preferably from 20° C. to 60° C., even more preferably from 25° C. to 60° C., still more preferably from 30° C. to 60° C. and most preferably from 35° C. to 50° C.

It is preferred that the grafting reaction is initiated by feeding a radical initiator (D) into the extruder. The radical initiator (D) can be fed into the feeding section of the extruder separately from components (A), (B) and (C), such as through a side feeder.

The radical initiator (D) can also be fed into barrel section of the extruder, such as together with component (C), such as into a control zone set to a temperature of 180° C. or lower.

The extruder preferably is a twin screw extruder, more preferably a co-rotating twin screw extruder.

The extruder may be e.g. any conventionally used extruder. As an example of an extruder for the present compounding step may be those supplied by Japan Steel works or Coperion, e.g. the ZSK co-rotating twin screw extruders with different screw diameters.

The extruder suitable for the process of the present invention can be a laboratory scale extruder or a commercial scale extruder.

In a laboratory scale extruder, the extrusion step is typically carried out using feed rates of 1 kg/h to 100 kg/h, more preferably 5 kg/h to 50 kg/h. In a commercial scale extruder, the throughput is typically from 1 to 50 ton/h, more preferably from 1.5 to 10 ton/h.

The screw speed of the extruder is preferably 170 rpm to 550 rpm, more preferably 200 rpm to 500 rpm.

Preferably, in said extrusion step the SEI (specific energy input) of the extruder may be 150 kWh/ton to 350 kWh/ton, more preferably 170 kWh/ton to 300 kWh/ton, whereby the SEI is directly calculated from the electric input of the extruder ignoring the intrinsically limited effectiveness.

The extruder temperature at the die plate is preferably in the range of from 180° C. to 250° C., more preferably from 185° C. to 230° C., most preferably from 195° C. to 230° C.

The barrel section of the extruder preferably comprises at least 5 control zones in each of which the temperature is independently controlled. Suitably the barrel section comprises from 5 to 15 control zones, preferably from 6 to 12 control zones.

In the compounding step of the process of the present invention the temperature of the control zones of the barrel section from the first control zone of the barrel section downstream the feeding section to the control zone in the middle of the barrel section is increased over the length of the barrel section in 2 or more steps.

This means that for a barrel section which comprises 5 or 6 control zones the temperature of control zones 1-3 is increased.

For a barrel section which comprises 7 or 8 control zones the temperature of control zones 1-4 is increased.

For a barrel section which comprises 9 or 10 control zones the temperature of control zones 1-5 is increased.

For a barrel section which comprises 11 or 12 control zones the temperature of control zones 1-6 is increased.

For a barrel section which comprises 13 or 14 control zones the temperature of control zones 1-7 is increased.

For a barrel section which comprises 15 control zones the temperature of control zones 1-8 is increased.

The temperature increase in two or more steps means that over the length of the barrel section from the first control zone of the barrel section downstream the feeding section to the control zone in the middle of the barrel section the temperature of two or more barrels, such as two barrels to five barrels, preferably of two barrels or three barrels, most preferably of two barrels, is set to a higher temperature than the temperature of the barrel upstream of said two or more barrels.

The temperature of the control zones of the barrel section from the first control zone of the barrel section downstream the feeding section to the control zone in the middle of the barrel section is typically increased in two steps to five steps, such as two steps, three steps, four steps or five steps, preferably two to four steps and more preferably two or three steps. In most extruder arrangements two steps of temperature increase are sufficient for the process of the invention.

The temperature increase of said two or more steps of increasing temperature is preferably in the range of 5° C. to 30° C., more preferably of 7.5° C. to 25° C., most preferably of 10° C. to 20° C. for each step independently.

The temperature of the control zones of the barrel section from the first control zone of the barrel section downstream the feeding section to the control zone in the middle of the barrel section is increased in two or more steps so that the temperature of the control zone in the middle of the barrel section is from 105% to 145%, more preferably from 110% to 140% and most preferably from 110% to 135% of the temperature in the first control zone of the barrel section downstream of the feeding section.

The temperature of the first control zone of the barrel section downstream of the feeding section is in the range of from higher than 85° C. to 180° C., preferably from 120° C. to 180° C., more preferably from 130° C. to 175° C., and most preferably from 140° C. to 170° C.

The temperature of the control zone in the middle of the barrel section is preferably from 15° C. to 60° C. higher, more preferably from 20° C. to 40° C. than the temperature in the first control zone of the barrel section.

It is preferred that the temperature of the control zones is increased from the first control zone of the barrel section to the control zone in the middle of the barrel section by increments of 5 to 20° C. from control zone to adjacent control zone.

The temperature of the control zones of the barrel section from the control zone in the middle of the barrel section to the control zone of the barrel section directly upstream of the die plate in maintained at the same temperature or increased to a temperature of not more than 120%, more preferably not more than 115%, still more preferably not more than 110% of the temperature of the control zone in the middle of the barrel section.

This means that for a barrel section which comprises 5 or 6 control zones the temperature of control zones 3 to 5 or 6 is maintained at the same temperature or increased to a temperature of not more than 120% than of the temperature of the control zone 3.

For a barrel section which comprises 7 or 8 control zones the temperature of control zones 4 to 7 or 8 is maintained at the same temperature or increased to a temperature of not more than 120% of the temperature of the control zone 4.

For a barrel section which comprises 9 or 10 control zones the temperature of control zones 5 to 9 or 10 is maintained at the same temperature or increased to a temperature of not more than 120% of the temperature of the control zone 5.

For a barrel section which comprises 11 or 12 control zones the temperature of control zones 6 to 11 or 12 is maintained at the same temperature or increased to a temperature of not more than 120% of the temperature of the control zone 5.

For a barrel section which comprises 13 or 14 control zones the temperature of control zones 7 to 13 or 14 is maintained at the same temperature or increased to a temperature of not more than 120% of the temperature of the control zone 5.

For a barrel section which comprises 15 control zones the temperature of control zones 8 to 15 is maintained at the same temperature or increased to a temperature of not more than 120% of the temperature of the control zone 5.

When increased the temperature of the last control zone of the barrel section is preferably from 5° C. to 30° C. higher, more preferably from 10° C. to 20° C. than the temperature in the control zone in the middle of the barrel section.

When maintained the temperature of the last control zone of the barrel section is the same as the temperature in the control zone in the middle of the barrel section.

From the first to the last control zone of the barrel section the temperature is preferably increased by 115% to 150%, more preferably from 120% to 145% and most preferably from 125% to 135% of the temperature of the first control zone of the barrel section.

The temperature of the last control zone of the barrel section is preferably from 30° C. to 75° C., more preferably from 35° C. to 70° C. and most preferably from 40° C. to 60° C. higher than the temperature of the first control zone of the barrel section.

The temperature of the last control zone of the barrel section can be the same as the temperature of the die plate.

In one especially preferred embodiment the barrel section has 6 control zones in which the temperature is independently controlled.

The feeding zone is preferably set to 35° C. to 50° C.
Control zone 1 is preferably set to 140° C. to 170° C.
Control zone 2 is preferably set to 170° C. to 180° C.
Control zone 3 is preferably set to 180° C. to 190° C.
Control zone 4 is preferably set to 190° C. to 200° C.
Control zone 5 is preferably set to 190° C. to 210° C.
Control zone 6 is preferably set to 190° C. to 210° C.
The die plate is preferably set to 190° C. to 210° C.

The measured temperature in the control zones may differ from the set temperatures by ±5° C., preferably ±4° C.

Component A

The polyethylene of component (A) is preferably a homopolymer of ethylene or a copolymer of ethylene with one or more alpha-olefin comonomer(s). It is also possible that component (A) is a mixture of a homo- and a copolymer of ethylene. If an ethylene copolymer forms part of component (A), preferably the comonomer(s) comprise(s) alpha-olefins having from 4 to 12 carbon atoms, more preferably from 4 to 10 carbon atoms and most preferably from 4 to 8 carbon atoms.

Examples of the alpha-olefin comonomers include, for example, propylene, 1-butene, 1-pentene, 1-hexene, 4-methyl-1-pentene, 1-octene, 1-decene, styrene and mixtures thereof. Particularly preferred comonomers are 1-butene, 1-hexene, 4-methyl-1-pentene and 1-octene.

The most preferred alpha-olefin comonomers are 1-hexene and 1-octene.

Typically, the amount of comonomer within the copolymer is up to 30.0 wt % of the total weight of the copolymer, more preferably is up 10.0 wt % of the total weight of the copolymer and most preferably is up to 6.0 wt % of the total weight of the copolymer.

The lower limit of amount of comonomer within the copolymer is usually 0.5 wt % of the total weight of the copolymer, more preferably is 1.0 wt % of the total weight of the copolymer.

Component (A) is preferably fed into the extruder in an amount of 60 to 90 wt %, preferably from 65 to 85 wt %, and in particular from 70 to 80 wt % of the total amount of components (A), (B) and (C).

Further preferred, component (A) before grafting has a melt flow rate $MFR_2$ of 1.0 to 10.0 g/10 min, more preferably of 3.0 to 8.0 g/10 min.

$MFR_2$ is measured according to ISO 1133 at a temperature of 190° C. under a load of 2.16 kg.

The density of the polyethylene of component (A) preferably is from 900 to 960 kg/m³, more preferably from 920 to 950 kg/m³, and most preferably from 925 to 945 kg/m³.

Further, the component (A) preferably has a polydispersity (PD), determined as ratio of weight average molecular weight to number average molecular weight, Mw/Mn, of from 1.5 to 6.0, more preferably from 1.7 to 5.5 and most preferably from 1.9 to 5.0, when determined from conventional GPC curves.

When polymerized in the presence of a single site catalyst component (A) preferably has a narrower polydispersity (PD), Mw/Mn, suitably of from 1.5 to 4.0, more preferably from 1.7 to 3.5.

When polymerized in the presence of a Ziegler-Natta catalyst component (A) preferably has a broader polydispersity (PD), Mw/Mn, suitably of from 2.5 to 6.0, more preferably from 2.7 to 5.5 and most preferably from 3.0 to 5.0.

Component (A) of the polymer composition can be produced in a process comprising a single site catalyst or a Ziegler-Natta catalyst.

Thereby, component (A) can be produced in a multi-phase polymerization process using e.g. slurry and/or gas phase reactors or in a single-phase polymerization process such as a solution polymerization process.

In one embodiment component (A) is polymerized in a multi-phase polymerization process using a single site catalyst.

Preferably, in said embodiment component (A) is produced in a process comprising a metallocene catalyst. Further preferred, the catalyst comprises a metallocene component on a porous support and an alumoxane component.

Preferred catalysts are those as described in EP 0 678 103, WO 97/28170, WO 98/56831 and/or WO 00/34341.

Preferably component (A) is produced in a process as disclosed in EP 0 678 103 which is characterized in that ethylene is slurry polymerised using a supported olefin polymerisation catalyst prepared by
  (1) providing a porous support, which is an inorganic oxide of an element chosen from groups 2 to 4 and 13 to 14 of the Periodic Table of Elements, preferably alumina or silica,
  (2) providing a solution comprising (2.1) the reaction product of (2.1.1) a metallocene of the formula (1)

$$(Cp)_m R_n MR'_o X_p \qquad (1)$$

wherein Cp is an unsubstituted or substituted and/or fused homo- or heterocyclopentadienyl, R is a group of 1-4 atoms connecting two Cp rings, M is a transition metal of group 4, 5 or 6 of the Periodic Table of Elements, preferably zirconium or hafnium, R' is a hydrocarbyl or hydrocarboxyl group having 1-20 carbon atoms, and X is a halogen atom, in which case m=1-3, n=0 or 1, o=0-3, p=0-3 and the sum m+n+p=the same as the state of oxidation of M, and (2.1.2) an alumoxane of the formula (2)

$$R''-(AlO)_x AlR''_2 \qquad (2)$$

which formula (II) depicts a linear compound, and/or of the formula (3)

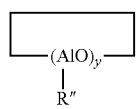

(3)

which formula (III) depicts a cyclic compound, and in which formulae (2) and (3) x is 1-40, preferably 10-20, y is 3-40, preferably 3-20, and R" is an alkyl group having 1-20 carbon atoms and
  (2.2) a solvent, capable of dissolving said reaction product,
  (3) impregnating the porous support with a volume of the solution, which does not exceed the total pore volume of the porous support, and
  (4) recovering the impregnated porous support, the pores of which are filled with said solution.

The preferred embodiments of the catalyst given in EP 0 678 103 are also preferred for the production of component (A).

Other preferred single-site catalysts are described in EP 688 794, EP 949 274, WO 95/12622, WO 00/34341 and WO 00/40620. Most preferred is the catalyst as described in WO 95/12622 and its preferred embodiments as described in this document.

In another embodiment component (A) is polymerized in a single-phase polymerization process using a single site catalyst.

Preferably, in said embodiment component (A) is produced in a process comprising a metallocene catalyst.

Thus, the polymerization catalyst system may be a metallocene catalyst as disclosed in WO-A-1993025590, U.S. Pat. No. 5,001,205, WO-A1987003604 and U.S. Pat. No. 5,001,244, or it may be a combination of these. Other suitable catalysts, such as late transition metal catalysts, can also be used.

Preferably, the polymerization catalyst system comprises a metallocene catalyst.

According to an embodiment, the polymerization catalyst system comprises
  (i) at least one metallocene complex of formula (I)

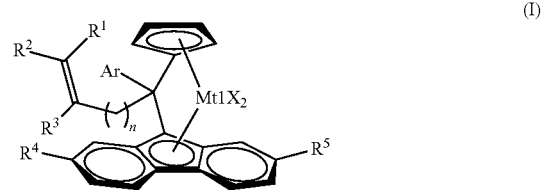

(I)

wherein
Mt1 is Hf,
X is a sigma-donor ligand,
R1, R2, R3 are the same or different from each other and can be hydrogen or a saturated linear or branched C1-C10 alkyl, whereby the alkyl group can optionally contain up to 2 heteroatoms belonging to groups 14-16 of the periodic table, or R1 and R2 or R2 and R3 can form a ring having 4 to 6 C-atoms and 1 to 3 double bonds,
R4 and R5 are the same or different from each other and can be saturated linear or branched C1-C10 alkyl, C5-C10 aryl, C6-C20 alkylaryl or C6-C20 arylalkyl groups, which can optionally contain up to 2 heteroatoms belonging to groups 14-16 of the periodic table,
n can be 1 to 5,
Ar is a C6-C20-aryl or -heteroarylgroup, which can be unsubstituted or substituted by 1 to 5 linear or branched C1-C10 alkyl group(s), and (ii) an aluminoxane cocatalyst and
(iii) optionally an aluminium alkyl compound Al(R7)3, with R7 being a linear or branched C2-C8-alkyl group.

This kind of catalyst has been described in more detail in document WO 2018/178151 A1, contents of which has been incorporated herein by reference.

According to an embodiment, the polymerization catalyst system comprises
(i) at least one metallocene complex of formula (II)

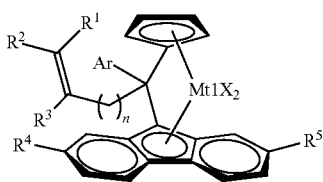

(II)

wherein
Mt1 is Hf,
X is a sigma-donor ligand,
R1, R2, R3 are the same or different from each other and can be hydrogen or a saturated linear or branched C1-C10 alkyl, whereby the alkyl group can optionally contain up to 2 heteroatoms belonging to groups 14-16 of the periodic table, or R1 and R2 or R2 and R3 can form a ring having 4 to 6 C-atoms and 1 to 3 double bonds,
R4 and R5 are the same or different from each other and can be saturated linear or branched C1-C10 alkyl, C5-C10 aryl, C6-C20 alkylaryl or C6-C20 arylalkyl groups, which can optionally contain up to 2 heteroatoms belonging to groups 14-16 of the periodic table, n can be 1 to 5,
Ar is a C6-C20-aryl or -heteroarylgroup, which can be unsubstituted or substituted by 1 to 5 linear or branched C1-C10 alkyl group(s), and
(ii) a boron containing cocatalyst.

This kind of catalyst has been described in more detail in document WO 2018/178152 A1, contents of which has been incorporated herein by reference.

According to an embodiment, the polymerization catalyst system comprises
(i) a metallocene complex of formula (III)

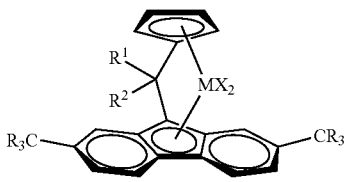

(III)

wherein
M is Hf or a mixture with Zr, provided that more than 50% by moles of the complex of Formula I has M=Hf,
X is a sigma ligand,
R are the same or different from each other and can be saturated linear or branched C1-C10 alkyl, C5-C10 aryl, C6-C20 alkylaryl or C6-C20 arylalkyl groups, which can optionally contain up to 2 heteroatoms or silicon atoms,
R1 is a C6-C20-aryl, which can be unsubstituted or substituted by one or up to 5 linear or branched C1-C10 alkyl group(s),
R2 is a saturated linear or cyclic C3-C20 alkyl group or a branched CR3R4R5 group, wherein R3 is hydrogen or a C1-C20 alkyl group and R4 and R5 are the same or are different and can be an C1-C20 alkyl group and
(ii) a boron containing cocatalyst.

This kind of catalyst has been described in more detail in document WO 2018/108917 A1, contents of which has been incorporated herein by reference.

According to an embodiment, the polymerization catalyst system comprises
(i) a metallocene complex of formula (IV)

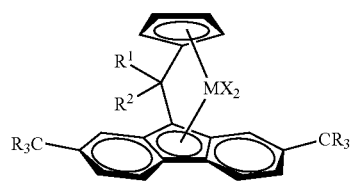

(IV)

wherein
M is Hf or a mixture with Zr, provided that more than 50% by moles of the complex of Formula I has M=Hf
X is a sigma ligand
R are the same or different from each other and can be saturated linear or branched C1-C10 alkyl, C6-C10 aryl, C4-C10 heteroaryl, C6-C20 alkylaryl or C6-C20 arylalkyl groups, which can optionally contain up to 2 heteroatoms or silicon atoms
R1 is a C6-C10 aryl or C6-C20 alkylaryl group optionally containing up to 2 heteroatoms or silicon atoms or a C4-C10 heteroaryl group
R2 is a C4-C20 cycloalkyl group, optionally carrying alkyl substituents in beta-positions, of formula (V)

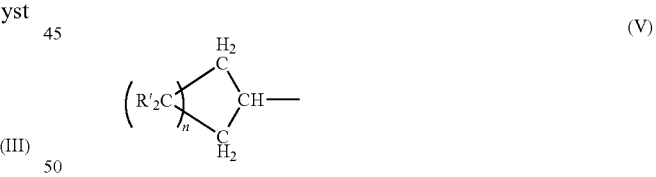

(V)

in which R' can be the same or can be different from each other and can be hydrogen or is defined as R and n is 1 to 17 and
(ii) a boron containing cocatalyst This kind of catalyst has been described in more detail in document WO 2018/108918 A1, contents of which has been incorporated herein by reference.

Other suitable metallocene catalysts have been described in WO 2015/158790 A1 and WO 2015/158791 A1.

In still another embodiment component (A) is polymerized in a multi-phase polymerization process using a Ziegler-Natta catalyst.

Suitable Ziegler-Natta catalysts in said embodiment preferably contain a magnesium compound, an aluminium compound and a titanium compound supported on a particulate support.

The particulate support can be an inorganic oxide support, such as silica, alumina, titania, silica-alumina and silica-titania. Preferably, the support is silica.

The average particle size of the silica support can be typically from 10 to 100 µm. However, it has turned out that special advantages can be obtained if the support has an average particle size from 15 to 30 µm, preferably from 18 to 25 µm. Alternatively, the support may have an average particle size of from 30 a 80 µm, preferably from 30 to 50 µm. Examples of suitable support materials are, for instance, ES747JR produced and marketed by Ineos Silicas (former Crossfield), and SP9-491, produced and marketed by Grace.

The magnesium compound is a reaction product of a magnesium dialkyl and an alcohol. The alcohol is a linear or branched aliphatic monoalcohol. Preferably, the alcohol has from 6 to 16 carbon atoms. Branched alcohols are especially preferred, and 2-ethyl-1-hexanol is one example of the preferred alcohols. The magnesium dialkyl may be any compound of magnesium bonding to two alkyl groups, which may be the same or different. Butyl-octyl magnesium is one example of the preferred magnesium dialkyls.

The aluminium compound is chlorine containing aluminium alkyl. Especially preferred compounds are aluminium alkyl dichlorides and aluminium alkyl sesquichlorides.

The titanium compound is a halogen containing titanium compound, preferably chlorine containing titanium compound. Especially preferred titanium compound is titanium tetrachloride.

The catalyst can be prepared by sequentially contacting the carrier with the above mentioned compounds, as described in EP-A-688794 or WO-A-99/51646.

Alternatively, it can be prepared by first preparing a solution from the components and then contacting the solution with a carrier, as described in WO-A-01/55230.

Another, especially preferred, group of suitable Ziegler-Natta catalysts contain a titanium compound together with a magnesium halide compound without an inert support. Thus, the catalyst contains a titanium compound on a magnesium dihalide, like magnesium dichloride. Such catalysts are disclosed, for instance, in WO-A-2005/118655 and EP-A-810235.

The Ziegler-Natta catalyst is used together with an activator. Suitable activators are metal alkyl compounds and especially aluminium alkyl compounds. These compounds include alkyl aluminium halides, such as ethylaluminium dichloride, diethylaluminium chloride, ethylaluminium sesquichloride, dimethylaluminium chloride and the like. They also include trialkylaluminium compounds, such as trimethylaluminium, triethyl-aluminium, tri-isobutylaluminium, trihexylaluminium and tri-n-octyl-aluminium. Furthermore they include alkylaluminium oxy-compounds, such as methylaluminiumoxane, hexaisobutylaluminiumoxane and tetraisobutyl-aluminiumoxane. Also other aluminium alkyl compounds, such as iso-prenylaluminium, may be used. Especially preferred activators are trialkylaluminiums, of which triethylaluminium, trimethylaluminium and tri-isobutylaluminium are particularly used.

The amount in which the activator is used depends on the specific catalyst and activator. Typically triethylaluminium is used in such amount that the molar ratio of aluminium to the transition metal, like Al/Ti, is from 1 to 1000, preferably from 3 to 100 and in particular from about 5 to about 30 mol/mol.

In yet another embodiment component (A) is polymerized in a single-phase polymerization process using a Ziegler-Natta catalyst.

Suitable Ziegler-Natta polymerization catalysts in said embodiment may be selected from Ziegler-Natta catalysts as disclosed e.g. in EP 0 721 474 A1 and EP 0 769 027 A1.

When producing component (A) in a multi-phase process in the presence of a single site catalyst or a Ziegler-Natta catalyst as described above, component (A) is preferably produced in a multi-stage process in a multi-step reaction sequence such as described in WO 92/12182. In this process, in a first step ethylene is polymerized in a loop reactor in the liquid phase of an inert low-boiling hydrocarbon medium.

Then, the reaction mixture after polymerisation is discharged from the loop reactor and at least a substantial part of the inert hydrocarbon is separated from the polymer.

The polymer is then transferred in a second or further step to one or more gas-phase reactors where the polymerization is continued in the presence of gaseous ethylene.

The polymer produced according to this process has a superior homogeneity with respect to the distribution of the different polymer fractions which cannot be obtained e.g. by a polymer mix.

When producing component (A) in a single-phase phase process in the presence of a single site catalyst or a Ziegler-Natta catalyst as described above, component (A) is preferably produced in a solution process, for example as disclosed in WO 2017/108951 A1 or WO 2017/108969 A1. Thereby, a solution comprising the catalyst components, ethylene monomer, comonomer and hydrogen is usually introduced to a polymerization reactor operating at a temperature within the range of from 120° C. to 250° C., such as from 140° C. to 220° C., most preferably from 150° C. to 200° C., depending on the content of comonomer units in the polymer and a pressure within the range of from 50 to 300 bar, preferably from 60 to 250 bar and more preferably from 70 to 200 bar.

Component (A) can be a unimodal polyethylene or a multimodal polyethylene.

In one embodiment component (A) can be a multimodal polyethylene. Further preferred, the multimodal polyethylene is a bimodal polyethylene.

The expression "modality of a polymer" refers to the form of its molecular weight distribution (MWD) curve, i.e. the appearance of the graph of the polymer weight fraction as a function of its molecular weight. If the polymer is produced in a sequential step process e.g. by utilizing reactors coupled in series and using different conditions in each reactor, the different polymer fractions produced in the different reactors will each have their own molecular weight distribution which may considerably differ from one another. The molecular weight distribution curve of the resulting final polymer can be looked at as the Superposition of the molecular weight distribution curves of the polymer fractions which will accordingly show two or more distinct maxima or at least be distinctly broadened compared with the curves for the individual fractions. A polymer showing such a molecular weight distribution curve is called "bimodal" or "multimodal", respectively. Multimodal polymers can be produced according to several processes which are described e.g. in WO 92/12182, WO 96/18662, WO 98/58001, WO 99/65949 and WO 2008/089978.

The multimodal polyethylene preferably comprises a low molecular weight (LMW) ethylene homo- or copolymer fraction and a high molecular weight (HMW) ethylene homo- or copolymer fraction.

Depending on whether the multimodal ethylene polymer is bimodal or has a higher modality, the LMW and/or BMW fraction may comprise only one fraction each or two or more subfractions.

Preferably, the ethylene polymer is a bimodal polymer consisting of one LMW fraction and one BMW fraction.

At least one fraction of the ethylene polymer preferably is a copolymer which was polymerized with a $C_3$-$C_{12}$ alpha-olefin as defined above. Preferably, the amount of comonomer in the ethylene polymer is 0.02-5.0 mol %, more preferably 0.05-2.0 mol %.

Preferably, the HMW fraction is an ethylene copolymer, preferably copolymerized with one of the above-cited comonomers. Further preferred, the LMW fraction of the polyethylene is a homopolymer.

Further, it is preferred that if component (A) is produced according to the above-described multi-stage process the LMW fraction is produced in the loop reactor and the HMW fraction in the gas-phase reactor.

The properties of the multimodal polyethylene can be adjusted by the ratio of the low molecular fraction and the high molecular fraction in the multimodal polyethylene.

In another embodiment component (A) is a unimodal polyethylene.

In this embodiment the unimodal polyethylene, such as the copolymer of ethylene and comonomers selected from alpha-olefins having from 3 to 12 carbon atoms as described above, is usually polymerized in one polymerization reactor.

The unimodal polyethylene can also be polymerized in two or more polymerization reactors using polymerization conditions which allow the polymerization of polyethylene fractions having basically the same properties.

Component (B)

Component (B) is preferably selected from copolymers of ethylene with polar comonomer units, polyolefin plastomers, polyolefin elastomers, olefin block copolymers or mixtures thereof, more preferably from copolymers of ethylene with polar comonomer units.

Component (B) can be an olefin block copolymers such as a propylene block copolymer or an ethylene block copolymer, for example a block copolymer of propylene and one or more alpha-olefin comonomers selected from ethylene, 1-butene, 1-pentene, 1-hexene, 1-octene, 4-methyl-1-pentene, 1,4-butadiene and 1,4-hexadiene or a block copolymer of ethylene and one or more alpha-olefin comonomers selected from propylene, 1-butene, 1-pentene, 1-hexene, 1-octene, 4-methyl-1-pentene, 1,4-butadiene, 1,4-hexadiene and norbornadiene. Examples of such elastomers include ethylene propylene rubber, ethylene propylene diene rubber (EPDM) and ethylene propylene norbornadiene rubber.

More preferably, component (B) is an elastomeric ethylene copolymer with one or more polar comonomer units. The polar comonomer units are preferably selected from alkylacrylates, alkylmethacrylates and alkylacetates Preferred examples of such elastomers are ethylene-alkylacrylates, ethylene-alkylmethacrylates and ethylene-alkylacetates. Further preferred, the comonomer is having a polar moiety of the formula

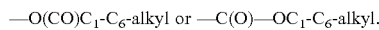

—O(CO)$C_1$-$C_6$-alkyl or —C(O)—O$C_1$-$C_6$-alkyl.

Particularly preferred elastomers are ethylenevinylacetate (EVA), ethylenemethylacrylate (EMA), ethylenemethylmethacrylate (EMMA), ethylenepropylacrylate and ethylenebutylacrylate (EBA), in particular EBA.

The amount of polar comonomer units in component (B) is preferably in the range of 15 to 40 wt %, more preferably 17 to 35 wt %, most preferably 20 to 30 wt %.

Component (B) may additionally comprise at least one comonomer being an alpha-olefin selected from the group of propylene, 1-butene, 1-pentene, 1-hexene, 1-octene, 4-methyl-1-pentene, 1,4-butadiene and 1,4-hexadiene.

The elastomer of component (B) may be made by any suitable process known in the art.

Preferably, component (B) is fed into the extruder in an amount of 9.0 to 38 wt %, more preferably 15 to 35 wt %, and most preferably 20 to 30 wt %, based on the total amount of components (A), (B) and (C).

Component (C)

As acid grafting agent, any such agent can be used which is known to be suitable for this purpose by the person skilled in the art.

Preferably, the acid grafting agent is an unsaturated carboxylic acid or a derivative thereof such as anhydrides, esters and salts (both metallic or non-metallic).

Preferably, the unsaturated group is in conjugation with the carboxylic group.

Examples of such grafting agents include acrylic acid, methacrylic acid, fumaric acid, maleic acid, nadic acid, citraconic acid, itaconic acid, crotonic acid, and their anhydrides, metal salts, esters amides or imides.

The preferred grafting agents are maleic acid its derivatives such as maleic anhydride, and in particular maleic anhydride.

Preferably, component (C) is fed into the extruder in an amount of 0.01 to 3.0 wt %, more preferably 0.03 to 1.5 wt %, based on the total amount of components (A), (B) and (C).

Component (D)

Grafting may be carried out in the presence or absence of a radical initiator (D) but is preferably carried out in the presence of a radical initiator (D) such as an organic peroxide, organic perester or organic hydroperoxide.

Mostly preferred the radical initiator (D) is selected from organic peroxides.

Preferably the radical initiator (D), more preferably the organic peroxide, is dissolved in a solvent before being fed into the feeding zone of the extruder.

A suitable organic peroxide can be selected from dialkyl peroxides such as e.g. lauroyl peroxide, didecanoyl peroxide, tert-butylcumylperoxide, 2,5-bis(2-ethylhexanoylperoxy)-2,5-dimethylhexane, 2,5-bis(tert-butylperoxy)-2,5-dimethylhexane, tert-butylcumylperoxide, tert-butylperoxypivalate, di(tert-butylperoxyisopropyl)benzene and mixtures thereof, preferably 2,5-bis(2-ethylhexanoylperoxy)-2,5-dimethylhexane, 2,5-bis(tert-butylperoxy)-2,5-dimethylhexane, di(tert-butylperoxyisopropyl)benzene and mixtures thereof. Solid radical initiators (D) can be dissolved in a solvent, such as isododecane.

The amount of radical initiator is preferably 0 wt % to 0.50 wt %, more preferably 0.001 wt % to 0.40 wt %, and most preferably 0.01 wt % to 0.25 wt %, based on the total amount of the components fed into the extruder.

Additives

Further additives can be fed into the extruder.

Suitable additives are the usual additives for utilization with polyolefins, such as stabilizers (e.g. antioxidant agents), metal scavengers and/or UV-stabilizers, antistatic agents and utilization agents (such as processing aid agents). The additives are preferably selected as not being able to react with the radical initiator (D) under the conditions of the process of the invention.

The amount of additives is preferably 0 wt % to 1 wt %, more preferably 0.001 wt % to 0.8 wt %, based on the total amount of the components fed into the extruder.

Polymer Composition

After compounding the components as defined above or below in the process according to the present invention a polymer composition with the following properties is obtained:

The polymer composition preferably comprises the non-elastomeric polyethylene (A) and the elastomer (B) onto which the acid grafting agent (C) has been grafted in the process of the present invention. Components (A), (B) and (C) of the polymer composition are preferably as defined above or below.

The polymer composition can further comprise additives as defined above or below.

The polymer composition preferably has a $MFR_2$ value of the final composition (after grafting) of 0.1 to 10.0 g/10 min, more preferably 0.8 to 6.0 g/10 min, and most preferably 1.0 to 5.0 g/10 min.

The polymer composition preferably has a density of from 900 to 960 kg/m$^3$, more preferably from 920 to 950 kg/m$^3$, and most preferably from 925 to 945 kg/m$^3$.

It is preferred that the polymer composition has two distinct peaks and a valley between said peaks in the GPC curve. Thereby, the GPC curve is defined below in the measurement methods as the concentration normalized LS 15 signal along the molecular weight of conventional GPC, obtained from the GPC-VISC-LS analysis.

From the area below said two peaks a Z-value can be calculated according to formula (I)

$$Z = s/\text{Abs}(B-A) \quad (I)$$

wherein

Abs(B−A) is the absolute value of (B−A);

A=the area, between the tangent parallel to the MW axis going through log M (Min) and the LS15 signal, from log M of 5.1 to log M value where the LS signal is minimum log M (Min), in the log M range between 5.1 and 6;

B=the area, between the tangent parallel to the MW axis going through log M (Min) and the LS15 signal, from log M(Min) to the point where the LS signal is crossed again;

and s is the slope between the two peaks of the GPC curve, defined at log M of 5.1 and 6.

The two peaks of the GPC curve are defined as the concentration normalised LS15 signal at log M(conv) of 5.1 and the concentration normalised LS15 signal at log M(conv) of 6.

Figure 2:
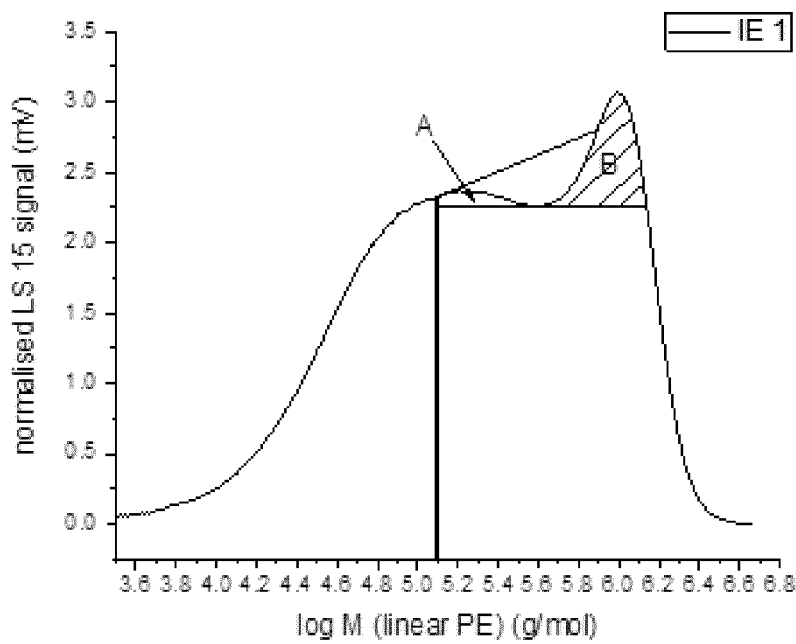
FIG. 2 shows the areas A and B in said GPC curve of example IE1 for calculating the Z-value in formula (I)

The areas A and B are shown in FIG. 2.

Preferably, the polymer composition has a Z-value of at least −1.0, more preferably of at least −0.5 and most preferably of at least −0.2.

In some embodiments the polymer composition preferably has a Z-value of at least 2, more preferably at least 3.

The Z-value can be as high as 50, preferably as high as 20, more preferably as high as 10.

The slope s between the two peaks of the GPC curve of the polymer composition is preferably at least 0.02, more preferably at least 0.05, still more preferably at least 0.25 and most preferably at least 0.50.

The slope s between the two peaks of the GPC curve can be as high as 2.0, preferably as high as 1.0.

The determination of the Z-value is illustrated in FIG. 2. As shown above, the Z-value can be determined from the areas A and B and the slope s. The GPC curve of the composition exhibits two distinct peaks with a valley between them. The left-hand peak corresponds to a lower molecular weight polymer and the right-hand peak to a higher molecular weight polymer.

The area A is the area under the molecular weight distribution curve and above the tangent drawn in the minimum point between the two peaks parallel to the MW axis, from the maximum point of the left-hand peak to the minimum point between the two peaks.

The area B is the area under the molecular weight distribution curve under the molecular weight distribution curve and above the tangent drawn in the minimum point between the two peaks parallel to the MW axis, from the minimum point between the two peaks to the point where the tangent intersects the molecular weight distribution curve to the right from the minimum point.

The slope s is the slope of the line connecting the maximum point of the left-hand peak to the maximum point of the right-hand peak.

The Z-value indicates that the slope between the two peaks in the GPC curve, being defined as the concentration normalized LS 15 signal obtained from the GPC-VISC-LS analysis, of the polymer composition of the invention is in a certain range. From the example section it can be seen that polymer compositions produced in a compounding process with higher temperatures in the first control zone and without incremental increase of the temperature in the first half of the control zones show a lower Z value which can be seen in the GPC curve as lower second peak. This indicates that in the compounding process of the invention a higher fraction of high molecular weight compound in the polymer composition is obtained. It is believed that this higher fraction of higher molecular weight compound results from an increase of highly branched polymer structures obtained from the grafting reaction.

The polymer composition according to the present invention is especially suitable as adhesive polymer composition e.g. for the production of an adhesive layer in multi-layered structures such as e.g. a three-layer coating of a metal pipe, such as a steel pipe.

The invention is further related to a polymer composition as defined above or below obtainable from the process as defined above or below.

Use

The present invention is further related to the use of the polymer composition as defined above or below as adhesive polymer composition.

The adhesive polymer composition is especially suitable for the production of an adhesive layer in multi-layered structures such as e.g. a three-layer coating of a metal pipe, such as a steel pipe.

The present invention is additionally related to the use of the polymer composition as defined above or below for the production of a multi-layer structure.

Preferably the polymer composition can be used for the production of an adhesive layer in a three-layer metal pipe coating having a peel strength at 23° C. of at least 200 N/cm, more preferably of at least 250 N/cm and most preferably of at least 300 N/cm.

The upper limit of the peel strength at 23° C. is usually not higher than 750 N/cm.

Further, the polymer composition can be used for the production of an adhesive layer in a three-layer metal pipe coating having a peel strength at 80° C. of at least 100 N/cm, more preferably of at least 125 N/cm and most preferably of at least 150 N/cm.

The peel strength at 80° C. is usually not higher than 300 N/cm.

Preferably, the coatings have a peel strength in the claimed range independent from the cooling procedure of the coated pipe, i.e. at conventional cooling rates and at faster cooling rates.

Pipes, preferably metallic pipes and most preferably steel-pipes are coated with a three-layer coating usually according to the following procedure:

It is preferable to properly prepare the surface of the pipe before coating as it is known in the art. The pipe surface is typically inspected for any rust, dirt, flaws, discontinuities, and metal defects. All the excess material needs be removed from the pipe surface to make sure that the coating is properly adhered to the pipe. Suitable cleaning methods include air and water high pressure washing, grit or shot blasting and mechanical brushing. Also acid wash and chromate pre-treatment is sometimes used.

Typically the pipes are heated with induction heating up to about 200° C. to 220° C. The temperature is adjustable depending on the line speed and the material being used in the corrosion preventing layer. When the epoxy Teknos Infralit EP8054 is used the steel pipe is preferably heated to 190° C. The temperature decreases slightly during the coating process.

If epoxy powder (at 23° C.) is used it is typically sprayed on with epoxy guns, where the speed of the rotating pipe is about 9 m/min. The thickness of the epoxy and other coating materials are set in accordance with end use specified requirements. Normal thickness value for the epoxy layer (on-shore installations) is from 70 to 200 µm, such as 135 to 160 µm.

Materials that may be used in the corrosion protection layer are, for instance, epoxy resins and organosilicon compounds. Examples of suitable epoxy resins are phenol-based epoxies and amine-based epoxies. These kinds of epoxies are sold, among others, under trade names of Infralit EP8054 (of Teknos), Scotchkote 6233P (of 3M) and PE50-7191 (of BASF). Suitable organosilicon compounds have been disclosed in EP-A-1859926.

The extrusion of the adhesive layer and the top-coating layer may be performed, for instance, with two single screw extruders. They may have a diameter of, for instance, from 30 to 100 mm, such as 60 mm, and a length of from 15 to 50 L/D, such as 30 L/D. The temperature is typically controlled in several zones and the temperature of the PE adhesive and coating layer after the die is from 190 to 300° C., such as 210° C. to 250° C., respectively. Die widths are from 50 to 300 mm, such as 80 mm and 200 mm for the adhesive layer and coating layer, respectively. Both adhesive layer and the coating layer are usually rolled tightly onto the pipe with a silicone pressure roller. The thickness of the adhesive layer is typically from 200 to 600 µm, such as 250 to 500 µm. The thickness of the coating layer is typically from 1 to 6 mm, preferably from 2 to 5 mm.

The adhesion layer preferably comprises the polymer composition, preferably the adhesive polymer composition according to the present invention.

The top coating layer preferably comprises a polyethylene resin, such as a HDPE resin or a crosslinked polyethylene resin, or a polypropylene resin.

After the coating the coated pipe is cooled, for instance by providing water flow on the coated pipe surface.

EXAMPLES

1. Measurement Methods
a) Melt Flow Rate

The melt flow rate (MFR) is determined according to ISO 1133-1, method B and is indicated in g/10 min. The MFR is an indication of the flowability, and hence the processability, of the polymer. The higher the melt flow rate, the lower the viscosity of the polymer. The $MFR_2$ of polyethylene is measured at a temperature of 190° C. and a load of 2.16 kg.

b) Density

Density of the polymer was measured according to ISO 1183-1:2004 Method A on compression moulded specimen prepared according to EN ISO 1872-2 (February 2007) and is given in $kg/m^3$.

c) Peel Strength

Peel strength designates the relative strength of the bonding between epoxy layer and adhesive layer. The peel strength of the coating compositions was measured at 23° C. and 80° C. according to ISO 21809-1:2011 using a Zwick Roell tensile testing machine, with the following alterations to the method: The peel strength was recorded for three minutes, after which the mean value of the peel strength recorded over these three minutes was calculated. The mean value corresponds to the reported peel strength of the composition.

d) Melting Temperature Tm

Melting temperature Tm, crystallization temperature Tcr, and the degree of crystallinity were measured according to ISO 11357 with Mettler TA820 differential scanning calorimetry (DSC) on 5 to 10 mg, typically 8±0.5 mg samples. Both crystallization and melting curves were obtained during 10° C./min cooling and heating scans between 30° C. and 225° C. Melting and crystallization temperatures were taken as the peaks of endotherms and exotherms.

e) GPC measurement

A PL 220 (Agilent) GPC equipped with an infra-red detector (IR4 (PolymerChar, Spain), an online four capillary bridge viscometer (PL-BV 400-HT), and a dual light scattering detector (PL-LS 15/90 light scattering detector) with a 15° and 90° angle was used. 3× Olexis and 1× Olexis Guard columns from Agilent as stationary phase and 1,2,4-trichlorobenzene (TCB, stabilized with 250 mg/L 2,6-Di tert butyl-4-methyl-phenol) as mobile phase at 160° C. and at a constant flow rate of 1 mL/min was applied. 200 µL of sample solution were injected per analysis.

All samples were prepared in the concentration range of 1.0-1.25 mg/ml and dissolved in 1,2,4-trichlorobenzene (TCB, stabilized with 250 mg/L 2,6-Di tert butyl-4-methyl-phenol) at 160° C. for 3 hours under continuous gentle shaking. The injected concentration of the polymer solution at 160° C. ($c_{160° C.}$) was adjusted for the volume expansion at 160° C. compared to 25° C. in the following way.

$$c_{160° C.} = \frac{w_{25}}{V_{25}} * 0.8772$$

with: $w_{25}$ (polymer weight) and $V_{25}$ (Volume of TCB at 25° C.).

Molecular Weight Averages, Polydispersity (Mn, Mw, Mz, MWD) by GPC-Conventional Analysis ($GPC_{conv}$)

For the GPC conventional ($GPC_{conv}$) approach the column set was calibrated using universal calibration (according to ISO 16014-2:2003) with 19 narrow MWD polystyrene (PS) standards in the range of 0.5 kg/mol to 11 500 kg/mol. The PS standards were dissolved at 160° C. for 15 min or alternatively at room temperatures at a concentration of 0.2 mg/ml for molecular weight higher and equal 899 kg/mol and at a concentration of 1 mg/ml for molecular weight below 899 kg/mol. The conversion of the polystyrene peak molecular weight to polyethylene molecular weights is accomplished by using the Mark Houwink equation and the following Mark Houwink constants:

$K_{PS}=19\times10^{-3}$ ml/g, $\alpha_{PS}=0.655$ $K_{PE}=39\times10^{-3}$ ml/g, $\alpha_{PE}=0.725$ A third order polynomial fit was used to fit the calibration data.

Molecular weight averages (Mz, Mw and Mn), Molecular weight distribution (MWD) and its broadness, described by polydispersity index, PD=Mw/Mn (wherein Mn is the number average molecular weight and Mw is the weight average molecular weight) were determined using the following formulas:

$$M_n = \frac{\sum_{i=1}^{N} A_i}{\Sigma(A_i/M_i)} \quad (1)$$

$$M_w = \frac{\sum_{i=1}^{N} (A_i \times M_i)}{\Sigma A_i} \quad (2)$$

$$M_z = \frac{\sum_{i=1}^{N} (A_i \times M_i^2)}{\Sigma(A_i/M_i)} \quad (3)$$

GPC-VISC-LS Analysis

For the GPC light scattering approach ($GPC_{LS}$) the inter detector delay volumes were determined with a narrow PS standard (MWD=1.01) with a molar mass of 130000 g/mol. The corresponding detector constants for the light scattering detector and the online viscometer were determined with the broad standard NIST1475A (Mw=52000 g/mol and IV=1.01 dl/g). The corresponding used do/dc for the used PE standard in TCB was 0.094 cm³/g. The calculation was performed using the Cirrus Multi-Offline SEC-Software Version 3.2 (Agilent).

The molar mass at each elution slice was calculated by using the 15° light scattering angle. Data collection, data processing and calculation were performed using the Cirrus Multi SEC-Software Version 3.2. The molecular weight was calculated using the option in the Cirrus software "use LS 15 angle" in the field "sample calculation options subfield slice MW data from". As do/dc used for the determination of molecular weight a value of 0.094 was used.

This molecular weight at each slice is calculated in the manner as it is described by by C. Jackson and H. G. Barth (C. Jackson and H. G. Barth, "Molecular Weight Sensitive Detectors" in: Handbook of Size Exclusion Chromatography and related techniques, C.-S. Wu, 2$^{nd}$ ed., Marcel Dekker, New York, 2004, p. 103) at low angle. For the low and high molecular region in which less signal of the LS detector or RI detector respectively was achieved a linear fit was used to correlate the elution volume to the corresponding molecular weight. Depending on the sample the region of the linear fit was adjusted.

Molecular weight averages (Mz(LS), Mw(LS) and Mn(LS)), Molecular weight distribution (MWD) and its broadness, described by polydispersity, PD(LS)=Mw(LS)/Mn(LS) (wherein Mn(LS) is the number average molecular weight and Mw(LS) is the weight average molecular weight obtained from GPC-LS) were calculated by Gel Permeation Chromatography (GPC) using the following formulas:

$$M_n(LS) = \frac{\sum_{i=1}^{N} A_i}{\Sigma(A_i/M_{i(LS)})} \quad (1)$$

$$M_w(LS) = \frac{\sum_{i=1}^{N} (A_i \times M_{i(LS)})}{\Sigma A_i} \quad (2)$$

$$M_z(LS) = \frac{\sum_{i=1}^{N} (A_i \times M_{i(LS)}^2)}{\Sigma(A_i/M_i(LS))} \quad (3)$$

For a constant elution volume interval $\Delta V_i$, where $A_i$ and $M_{i(LS)}$ are the chromatographic peak slice area and polyolefin molecular weight (MW) determined by GPC-LS.

For the molecular weight averages Mz, Mw and Mn the polyolefin molecular weight (MW) was determined by $GPC_{conv}$, where Mz(LS), Mw(LS) and Mn(LS) stands that this molecular weight averages were obtained by $GPC_{LS}$ approach.

Calculation the Slope Value (z) from the LS 15 Slope (s) and the Areas A and B

To analyse the slope and the areas of the concentration normalized light scattering detector at an angle of 15° along the molecular weight determined by $GPC_{conv}$ is a useful tool to differentiate between different production setting and recipes and determine especially structural differences in the high molecular weight region.

To determine the LS15 slope and the areas A and B in a first step the concentration normalized light scattering detector at an angle of 15° needs to be plotted over the molecular weight determined by GPC conventional. The obtained concentration normalised LS 15 signal can then be used to calculate the slope s and the areas A and B by applying the following 4 steps.

The 1$^{st}$ step is to generate a concentration normalized LS chromatogram. Therefore, the detector response of the LS 15 signal in mV has to be normalized to the concentration of the analysed polymer solution, meaning that the detector signal is divided by the concentration of the polymer solution in mg/ml obtained from the concentration detector. The normalized LS15 signal is then plotted versus the logarithmic values of the molecular weights in g/mol obtained from conventional GPC analysis approach.

The 2$^{nd}$ step is to calculate the slope between the concentration normalised LS15 signal at log M(conv) of 5.1 and the peak maximum of the 2nd peak of the LS15 signal at high molecular weight (log M(conv) at 6).

The 3$^{rd}$ step is to determine the line (l)

For this a line is defined in the following way:

A parallel line to the MW axis is defined with a y value of the line which is identical with the value at which the LS15 signal show a minimum in the log M(conv) range between 5.1 and 6. The corresponded log M(conv) of this point is defined as log M(min). The x value is from 5.1 to the log M(conv) value where the line would cross the concentration normal LS15 (log M(CP)), where CP stands for cross point.

The 4$^{th}$ step is to determine the areas A and B (see FIG. 2).

The area A+B is defined as the area between the line 1 and the concentration normalised LS signal. The area A is the area ranging from log M(conv) of 5.1 to the log M(conv) value of log M(min), where the area B is the area from log M(min) to log M(CP).

The 5th step is to calculate the LS slope value z, which is defined $$Z = s/\mathrm{Abs}(B-A)$$

with

Abs(B−A)=the absolute value of (B−A);

A=the area, between the tangent parallel to the MW axis going through log M (Min) and the LS15 signal, from log M of 5.1 to log M value where the LS signal is minimum log M (Min), in the log M range between 5.1 and 6;

B=the area, between the tangent parallel to the MW axis going through log M (Min) and the LS15 signal, from log M(Min) to the point where the LS signal is crossed again, and s is the slope between the two peaks of the GPC curve, defined at log M of 5.1 and 6.

2. Components of the Polymer Composition

The following components were used for the production of the polymer compositions of the examples:

PE1: A copolymer of ethylene and 1-octene was polymerized in a solution polymerization process using a Ziegler-Natta catalyst as described in Example III of WO 95/09191 A. The catalyst/donor feed inside the reactor (average) was BOMAG, SEAC, TBT. The catalyst/donor feed inside the reactor (average) was BOMAG, SEAC, TBT, 2-chlorobutane and TEA as activator. The obtained copolymer has a density of 935 kg/m³, a MFR$_2$ of 7.3 g/10 min, and a melting temperature, Tm, of 124° C.

The polymerization conditions and polymer properties are shown in Table 1 below.

PE2 A copolymer of ethylene and 1-octene was polymerized in a solution polymerization process using a Ziegler-Natta catalyst as described in Example III of WO 95/09191 A. The catalyst/donor feed inside the reactor (average) was BOMAG, SEAC, TBT. The catalyst/donor feed inside the reactor (average) was BOMAG, SEAC, TBT, 2-chlorobutane and TEA as activator. The obtained copolymer has a density of 936 kg/m³, a MFR$_2$ of 4.5 g/10 min, and a melting temperature, Tm, of 125° C.

The polymerization conditions and polymer properties are shown in Table 1 below.

EBA An ethylene butyl acrylate elastomer, having a butyl acrylate content of 27% by weight a density of 927 kg/m³ and an MFR$_2$ value of 4 g/10 min was used as elastomer.

MAH Maleic anhydride was used as acid grafting agent

PDX Perkadox 14S-fl, distributed by Akzo Nobel (10 wt % dissolved in isododecane) was used as radical initiator

TABLE 1

Polymerization conditions and properties of PE1 and PE2

|  | PE1 | PE2 |
| --- | --- | --- |
| Polymerization Conditions: |  |  |
| C(8-1)/C2 ratio (kg/kg) | 0.25 | 0.25 |
| Reactor temperature (° C.) | 200.0 | 201.0 |
| H2/C2 ratio (Nm³/ton) | 0.75 | 1.00 |
| C2 conversion (%) | 95.00 | 99.50 |
| Exit temperature deep cooling (° C.) | −30.0 | −32.50 |
| Absorption ratio C6/C2 (kg/kg) | 4.6 | 4.20 |
| iPCl conc. in monomer stream (mg/l) | 2.5 | 2.5 |
| Polymer Properties: |  |  |
| Density (g/cm³) | 0.935 | 0.936 |
| MFR(190/2.16) | 7.25 | 4.47 |
| Mn [g/mol] | 17000 | 18000 |
| Mw [g/mol] | 62000 | 64000 |
| Mw/Mn | 3.7 | 3.6 |
| % C8 [mol %] | 1.0 | 1.00 |
| % C8 [wt %] | 4.1 | 4.00 |
| Tm [° C.] | 124 | 125 |

The following feeds of the above listed components as listed in Table 2 were used for production of the adhesive polymer components of the examples:

TABLE 2

Feeds for producing the polymer compositions of the examples

|  | CE1 | IE1 | IE2 | IE3 |
| --- | --- | --- | --- | --- |
| PE1 [wt %] | 77.8 | 75.8 | 75.8 | — |
| PE2 [wt %] | — | — | — | 75.8 |
| EBA [wt %] | 22.0 | 24.0 | 24.0 | 24.0 |
| MAH [wt %] | 0.2 | 0.2 | 0.2 | 0.2 |
| POX solution feed [g/min] | 0.54 | 0.54 | 0.51 | 0.54 |

3. Compounding and Grafting of the Polymer Compositions of the Examples

The adhesive polymer compositions of the examples were compounded and grafted in a Werner & Pfleiderer ZSK 30 co-rotating twin-screw extruder having a L/D of 38 with 12 barrels. The temperature control of the extruder barrels was divided into the following 6 control sections. Thereby, barrel 1 represents the feeding section and barrels 2 to 12 represent the barrel section.

Barrel 1 is the feeding section.
Barrels 2 and 3 are combined to control section 1.
Barrel 4 is control section 2.
Barrels 5 and 6 are combined to control section 3.
Barrels 7 and 8 are combined to control section 4.
Barrels 9 and 10 are combined to control section 5.
Barrels 11 and 12 are combined to control section 6.

The barrels were heated with electrical heaters and cooled with closed loop water-glycol circulation, if necessary, or were not cooled (in normal operation typically no cooling is necessary). In addition to the temperature measurements from the barrels also the melt temperature and pressure at the die plate were measured.

The following temperatures of the different zones of the extruder as listed below in Table 3 were targeted for the examples:

TABLE 3

Targeted temperatures for the zones of the extruder

|  | CE1 | IE1 | IE2 | IE3 |
| --- | --- | --- | --- | --- |
| Temperature Feeding zone [° C.] | <40 | <40 | <40 | <40 |
| Temperature Control zone 1 [° C.] | 180 | 160 | 160 | 160 |
| Temperature Control zone 2 [° C.] | 200 | 170 | 170 | 170 |

TABLE 3-continued

Targeted temperatures for the zones of the extruder

|  | CE1 | IE1 | IE2 | IE3 |
|---|---|---|---|---|
| Temperature Control zone 3 [° C.] | 200 | 190 | 180 | 180 |
| Temperature Control zone 4 [° C.] | 200 | 200 | 200 | 200 |
| Temperature Control zone 5 [° C.] | 200 | 200 | 200 | 200 |
| Temperature Control zone 6 [° C.] | 200 | 210 | 210 | 210 |
| Temperature die plate [° C.] | 200 | 210 | 210 | 210 |

From Table 3 it can be seen that the composition of comparative process CE1 was compounded using an even temperature profile of 200° C. over control zones 2-6 and the die plate, starting with a temperature of 180° C. in control zone 1. The comparative process of CE1 reflects the prior art run temperature profile.

The composition of inventive process IE1 was compounded in a process starting at a lower temperature of 160° C. in control zone 1 and an incremental increase of the temperature up to 200° C. in control zone 4. The temperature was then slightly increased in the following control zones to a temperature of 210° C. in control zone 6 and the die plate.

The compositions of inventive processes IE2 and IE3 were compounded in a process starting at a temperature of 160° C. in control zone 1 and an incremental increase of the temperature up to 180° C. in control zone 3 compared to up to 190° C. in the process for compounding the composition of IE1. The temperature profile of control zones 4-6 and the die plate is the same as in the process for compounding the composition of IE1.

The compositions of IE2 and IE3 differ in using a different non-elastomeric polyethylene PE1 or PE2.

A dry blend of the PE (PE1 for CE1, IE1 and IE2 and PE2 for IE3), EBA and MAH were fed through the hopper into the feeding section of the extruder. The PDX solution was fed into a side feeding entrance into the feeding section of the extruder.

The following compounding conditions as listed below in Table 4 were applied during the compounding and grafting procedure of the examples.

TABLE 4

Compounding and grafting conditions

|  | CE1 | IE1 | IE2 | IE3 |
|---|---|---|---|---|
| Throughput [kg/h] | 8 | 8 | 8 | 8 |
| Screw speed [rpm] | 200 | 200 | 200 | 200 |
| Melt temp. (die) [° C.] | 203 | 224 | 225 | 225 |
| Melt pressure (die) [bar] | 20 | 19-20 | 18-20 | 20-22 |
| Torque [%] | 73 | 82-83 | 84-85 | 84-86 |
| Temperature feeding zone [° C.] | <40 | <40 | <40 | <40 |
| Temperature control zone 1 [° C.] | 176 | 160 | 160 | 160 |
| Temperature control zone 2 [° C.] | 199 | 170 | 170 | 170 |
| Temperature control zone 3 [° C.] | 198 | 191 | 180 | 180 |
| Temperature control zone 4 [° C.] | 199 | 200 | 200 | 200 |
| Temperature control zone 5 [° C.] | 202 | 200 | 200 | 199 |
| Temperature control zone 6 [° C.] | 197 | 210 | 211 | 210 |
| Temperature die plate [° C.] | 196 | 210 | 210 | 210 |
| MFR$_2$ (compounded composition) [g/10 min] | 1.22 | 1.19 | 1.17 | 1.06 |

The polymer compositions of examples CE1, IE1 and IE2 all show a MFR$_2$ value of about 1.2 g/10 min whereas the polymer composition of example IE3 shows a MFR$_2$ value of about 1.1 g/10 min due to the use of PE2 instead of PE1.

The polymer compositions of examples CE1, IE1, and IE2 prepared above were subjected to GPC measurements and GPC-VISC-LS analysis. FIG. 1 shows the LS 15 signal obtained from the GPC-VISC-LS analysis of examples CE1, IE1-a and IE2.

It can be seen in FIG. 1 that the inventive examples IE1 and IE2 show a higher second peak on the right side with an increased area B under said second peak compared to the accordant comparative example whereas the first peaks on the left side have an comparable height and area A. It is believed that these differences result from a higher fraction of high molecular weight compound in the polymer composition of the inventive examples.

From the LS 15 signal obtained from the GPC-VISC-LS analysis of examples CE1, IE1, and IE2 the Z-values are calculated by deriving the areas A and B and the slope s between the first and second peak from the LS 15 signal obtained from the GPC-VISC-LS analysis as shown in FIG. 2. The Z-values are listed in Table 5 below.

TABLE 5

Z-values and slope s of the polymer compositions

|  | CE1-a | IE1 | IE2 |
|---|---|---|---|
| Z-value | −25.2 | 5.0 | 5.5 |
| slope s | −0.55 | 0.81 | 0.73 |

4. Pipe Coating

The compositions prepared as described above we used as adhesive polymer compositions in adhesive layers in a three-layer pipe coating.

First, steel pipes with a diameter of 114.3 mm and a wall thickness of 5 mm were heated in a rotating steel pipe line with a line speed of 9 m/min set to a temperature of 200-220° C. and were sprayed with epoxy powder as corrosion protection.

Subsequently, the polymer compositions prepared above and a conventional high density polyethylene were co-extruded onto the epoxy layer as adhesive layer and outer protection layer. The co-extrusion was performed with a KM-45 single screw extruder for the high density polyethylene topcoat and an Extron 50 single screw extruder for the polymer compositions prepared above. The temperature at the die of the extrusion of the polymer compositions was 215° C. The temperature at the die of the extrusion of the high density polyethylene composition was 215° C.

The following layer thicknesses were targeted:

Epoxy layer: 150 μm

Adhesive layer: 480 μm

Protective outer layer: 4.2 mm

Both the adhesive layer and the protective outer layer were rolled tightly onto the coating surface with a silicone pressure roller.

The coated pipes were subjected to a two different cooling procedures as described below in Table 6.

TABLE 6

Cooling procedures

| | Normal cooling | Short cooling |
|---|---|---|
| Epoxy layer on hot steel pipe | 190° C. | 190° C. |
| Adhesive layer on epoxy layer | 225° C. | 225° C. |
| Outer layer on adhesive layer | 250° C. | 250° C. |
| Water cooling | until 40° C. | until 85° C. |
| Cooling in ambient air | until 23° C. | until 23° C. |

In both cooling procedures the coated pipe is subjected to a water cooling step in which the pipe is cooled in a water spray chamber until a target temperature of about 40° C. for normal cooling and about 85° C. for short cooling is obtained. Compared to the normal cooling procedure in the short cooling procedure the water cooling step is significantly shortened until the pipe reaches a temperature of about 85° C. instead of about 40° C. of the normal cooling procedure in order to simulate faster line speeds through the cooling bath. The coated pipe is instead removed from the water spray chamber and left to cool down from about 80° C. to about 23° C. in ambient air, which takes about 90-120 minutes. In the normal cooling step the pipe, which is cooled down in the water cooling step to a temperature of about 40° C. is also removed from the water spray chamber and left to cool down from about 40° C. to about 23° C. in ambient air.

After cooling the pipe coatings were subjected to peel strength tests at 23° C. and 80° C. The results are shown below in Table 7.

TABLE 7

Peel strength of the pipe coatings

| | Peel strength (23° C.), normal cooling [N/cm] | Peel strength (23° C.), short cooling [N/cm] | Peel strength (80° C.), normal cooling [N/cm] | Peel strength (80° C.), short cooling [N/cm] |
|---|---|---|---|---|
| CE1 | 381 | 203 | 138 | 75 |
| IE1 | 495 | 334 | 173 | 158 |
| IE2 | 363 | 346 | 174 | 157 |
| IE3 | 464 | 501 | 185 | 193 |

It can be seen that the coatings including adhesive layers made from the polymer composition prepared according to the compounding procedure according to the present invention show a higher peel strength after the short cooling procedure compared to the coatings including adhesive layers made from the polymer composition prepared according to the comparative compounding procedures.

The polymer composition prepared according to the compounding procedure according to the present invention thereby meet the requirements of ISO 21809-1:2011 Class C for peel strength measurements at 23° C. and ISO 21809-1:2011 Class B for peel strength measurements at 80° C. also after the short cooling procedure.

The invention claimed is:
1. A process for producing a polymer composition comprising
(A) a non-elastomeric polyethylene,
(B) an elastomer, which is selected from copolymers of ethylene with polar comonomer units, polyolefin plastomers, polyolefin elastomers, olefin block copolymers or mixtures thereof, and
(C) an acid grafting agent, comprising the steps of:
feeding components (A), (B) and (C) into an extruder comprising a feeding section, a barrel section and a die plate, wherein the barrel section of the extruder downstream of the feeding section and upstream of the die plate is divided into a plurality of control zones, and the first control zone represents the first control zone within the barrel section downstream of the feeding zone in which the fed component(s) (A) and/or (B) start(s) to melt;
compounding the components (A) and (B) in order to form the polymer composition; and
grafting component (A) or components (A) and (B) with component (C) during the compounding step;
wherein the process further comprises the step of
independently controlling the temperature of each control zone of the plurality of control zones of the barrel section of the extruder as such that
a) the temperature in the first control zone of the barrel section downstream of the feeding section is in the range of from higher than 85° C. to 180° C.,
b) the temperature of the control zones of the barrel section from the first control zone of the barrel section downstream the feeding section to the control zone in the middle of the barrel section is increased over the length of the barrel section in two or more steps so that the temperature of the control zone in the middle of the barrel section is from 105% to 145% of the temperature in the first control zone of the barrel section downstream of the feeding section; and
c) the temperature of the control zones of the barrel section from control zone in the middle of the barrel section to the control zone of the barrel section directly upstream of the die plate in maintained at the same temperature or increased to a temperature of not more than 120% of the temperature of the control zone in the middle of the barrel section,
wherein the polymer composition has two distinct peaks and a valley between the peaks in the GPC curve and a Z value, determined from the areas below the two peaks of the GPC curve, of at least −1.0, wherein the Z-value is determined according to formula (I)

$$Z = s/\mathrm{Abs}(B-A) \quad (I)$$

wherein
Abs (B−A) is the absolute value of (B−A);
A=the area, between the tangent parallel to the MW axis going through log M (Min) and the LS15 signal, from log M of 5.1 to log M value where the LS signal is minimum log M (Min), in the log M range between 5.1 and 6;
B=the area, between the tangent parallel to the MW axis going through log M (Min) and the LS15 signal, from log M (Min) to the point where the LS signal is crossed again; and
s is the slope between the two peaks of the GPC curve, defined at log M of 5.1 and 6,
wherein the GPC curve is defined as the concentration normalized LS15 signal obtained from GPC-VISC-LS analysis.
2. The process according to claim 1, wherein the extruder is a twin-screw extruder.
3. The process according to claim 1, wherein temperature of the feeding section is in the range of from 20° C. to 70° C.

4. The process according to claim 1, wherein the temperature increase of said two or more steps of increasing temperature is in the range of 5° C. to 30° C. for each step independently.

5. The process according to claim 1, wherein a radical initiator (D) is fed into the extruder in order to initiate the grafting of component (A) or components (A) and (B) with component (C) and the radical initiator (D) is selected from lauroyl peroxide, didecanoyl peroxide, tert-butylcumylperoxide, 2,5-bis(2-ethylhexanoylperoxy)-2,5-dimethylhexane, 2,5-bis(tert-butyl peroxy)-2,5-dimethylhexane, tert-butylcumylperoxide, tert-butylperoxypivalate, di(tert-butylperoxyisopropyl)benzene and mixtures thereof.

6. The process according to claim 1, wherein component (A) is a copolymer of ethylene and one or more comonomer(s) selected from alpha-olefins having from 4 to 12 carbons atoms and has a density of from 900 kg/m³ to 960 kg/m³ and/or a melt flow rate MFR2 (190° C., 2.16 kg) of from 1.0 to 10.0 g/10 min before grafting.

7. The process according to claim 1, wherein component (B) is selected from copolymers of ethylene with polar comonomer units.

8. The process according to claim 1, wherein component (C) is selected from unsaturated carboxylic acids or derivatives thereof.

9. The process according to claim 1, wherein components (A), (B) and (C) are fed in the following amounts of the total amount of components (A), (B) and (C) into the extruder:
from 60 to 90 wt % of component (A);
from 9.0 to 38 wt % of component (B); and
from 0.01 to 3.0 wt % of component (C).

10. A polymer composition obtainable from the process according to claim 1.

11. The polymer composition according to claim 10 having a melt flow rate $MFR_2$ (190° C., 2.16 kg) of from 0.1 to 10.0 g/10 min and/or a density of from 900 kg/m³ to 960 kg/m³.

12. The polymer composition according to claim 10 being an adhesive polymer composition.

13. The polymer composition according to claim 10 being in a multi-layer structure.

14. The polymer composition according to claim 13 being an adhesive composition in an adhesive layer in a three-layer metal pipe coating having a peel strength at 23° C. of at least 200 N/cm and/or a peel strength at 80° C. of at least 100 N/cm.

* * * * *